United States Patent [19]

Lerchbaum

[11] Patent Number: 4,958,696
[45] Date of Patent: Sep. 25, 1990

[54] SWITCHING ARRANGEMENT FOR THE HYDRAULIC DRIVE MEANS OF A FULL-TRACK VEHICLE

[75] Inventor: Karl Lerchbaum, Fohnsdorf, Austria

[73] Assignee: Voest-Alpine Maschinenbau Gesellschaft m.b.h., Linz, Austria

[21] Appl. No.: 307,523

[22] Filed: Feb. 8, 1989

[30] Foreign Application Priority Data

Feb. 10, 1988 [AT] Austria .................................. 286/88

[51] Int. Cl.⁵ ........................ B62D 11/02; F15B 11/16
[52] U.S. Cl. ...................................... 180/6.7; 60/424; 180/9.44
[58] Field of Search .......................... 180/9.1, 9.0, 9.44, 180/9.46, 242, 241, 6.2, 6.24, 6.3, 6.66, 6.7; 60/424; 91/520

[56] References Cited

U.S. PATENT DOCUMENTS

| | | | |
|---|---|---|---|
| 3,442,344 | 5/1969 | Ocule ................................. | 60/424 X |
| 3,713,296 | 1/1973 | Black .................................. | 91/520 X |
| 3,788,075 | 1/1974 | Holdeman et al. .................... | 60/424 |

FOREIGN PATENT DOCUMENTS

| | | |
|---|---|---|
| 3115606 | 5/1982 | Fed. Rep. of Germany . |
| 1214511 | 12/1970 | United Kingdom .................. 60/424 |

Primary Examiner—Mitchell J. Hill
Attorney, Agent, or Firm—Cushman, Darby & Cuchman

[57] ABSTRACT

In a switching arrangement for the hydraulic drive of a full-track vehicle, in which arrangement at least one drive motor is associated with each respective endless ground-engaging track at both sides of the longitudinal axis of the vehicle, there are provided for the drive motors located at both sides of the longitudinal axis of the vehicle, a common source of pressurized fluid and a valve arrangement by which the drive motors can be connected with the common source of pressurized fluid in series for moving the tracks in the same sense and in parallel for moving the tracks in a mutually opposing sense, and by which each drive motor can, if required, separately be supplied with pressurized fluid.

3 Claims, 2 Drawing Sheets

SWITCHING ARRANGEMENT FOR THE HYDRAULIC DRIVE MEANS OF A FULL-TRACK VEHICLE

BACKGROUND OF THE INVENTION

Field of the Invention

The invention refers to a switching arrangement for the hydraulic drive means of a full-track vehicle, in which arrangement at least one drive motor is associated with each respective endless, ground-engaging track at both sides of the longitudinal axis of the vehicle.

Description of the Prior Art

The track chassis of full-track vehicles allow a vehicle of this type to travel along a straigth path, but also along a curved path. For the purpose of travelling along a curved path, one of both endless, ground-engaging track at one side of the longitudinal axis of the vehicle can, in a manner known per se, be blocked or be driven in an opposite direction to the track or tracks on the other side for the purpose of turning the vehicle on a narrow place. When travelling along a straight path, the drive motors of the tracks on both sides of the longitudinal axis of the vehicle are driven in the same sense. Chassis with endless, ground-engaging tracks at both sides are primarily uses, in the mining industry, for drift-advancing machines and exploiting machines, but also for movable consolidating trestles and, in particular, in connection with supporting props used for securing the excavating edge. When travelling along a curved path and, in particular, when turning the vehicle in a narrow space, there are required high driving torques, and known constructions are designed such that a separate pump for the pressurized fluid and a separate switching arrangement are provided for each hydraulic motor. This respective separate energizing equipment must be designed in accordance with the required maximum driving power of the respective pump. The dimensioning of such driving units results, as a rule, in a compromise between the achievable travelling speed for travelling along a straight path and the required torque or, respectively, high traction force of the tracks for travelling along a curved path or for turning the vehicle around.

SUMMARY OF THE INVENTION

The invention provides a switching arrangement of the initially mentioned type, by means of which the expenditure for the driving aggregates may be reduced and by means of which a high speed for travelling along a straight path as well as a high torque or, a high traction force for the track in case of travelling along a curved path or in case of turning around the vehicle can be obtained. For solving this task, the switching arrangement according to the invention essentially consists in that a common source of pressurized fluid is provided for the drive motors at both sides of the longitudinal axis of the vehicle and in that a valve arrangement is provided by means of which the drive motors can be connected in series for moving the treaded, endless ground-engaging tracks in the same sense and be connected in parallel for moving the tracks in mutual opposing sense with the common source of pressurized fluid and by means of which each drive motor can, if required, separately be supplied with pressurized fluid. On account of only one common drive unit and thus only one common source of pressurized fluid being provided, the expenditure for the drive means is thus substantially reduced. On account of a valve arrangement being provided for connecting with this common source of pressurized fluid, the drive motors, either in series for moving the tracks in the same sense, or in parallel for moving the tracks in the mutually opposite sense, the required operating conditions are taken in consideration with a low-weight driving unit of smaller dimension. A correspondingly high speed with correspondingly lower torque can be obtained in the series arrangement and a high torque can be obtained in the parallel arrangement, without the necessity of oversizing the pump units for the purpose of achieving a high torque. Under the condition of series arrangement, half of the torque becomes active in case of two drive motors and full through-put power of the pump of the source of pressurized fluid, whereas under the condition of parallel arrangement the full torque becomes effective at the drive motors with correspondingly reduced volumetric flow.

The hydraulic circuitry may be realized with simple and operationally safe constructional parts. The arrangement to preferably is such that the valve arrangement comprises three multi-way valves each having three switching positions and three connectors. In such an arrangement, one of the multi-way valves is connected with the supply conduits of both motors and the other two multi-way valves are each connected with a supply conduit of one motor. All multi-way valves are connected with the source of pressurized fluid and with the returen conduit. By means of three multi-way valves of this type, a correspondingly high speed can reliably be obtained for travelling along a straight path by pressure distribution and series arrangement, and a high traction force of the tracks can reliably be obtained for travelling along a curved path. For travelling along a curved path, a high torque is at the operator's disposal by distributing in the parallel arrangement the volume of the supplied fluid to both of the hydraulic motors. When travelling along a curved path, a high torque is at the operator's disposal for each motor. The possible travelling speed is, however, lower than when travelling along a straight path, in which case only half of the torque is at the operator's disposal for each motor.

The valve arrangement may include check valves or hydraulic logic elements. In a particularly simple manner, the multi-way valves are designed as slide valves. On account of their respective three switching positions, there is provided the possibility either to travel with high speed along a straight path or to block one of the respective tracks and to energize the other track with pressurized fluid for the purpose of travelling along a curved path. On account of one of the multi-way valves being connected with the supply conduits of both motors, there is further provided the possibility to turn the vehicle through 180 degrees about a vertical axis at the existing location, by energizing the drive motors of the tracks for movement in opposing senses.

The high travelling speed being achieveable by connecting the drive motors according to the series arrangement could be obtained in a usual arrangement comprising two separate drive units or pumps, only by means of substantially greater pumps, which results in restrictions with respect to the volumetric capacity.

BRIEF DESCRIPTION OF THE DRAWING

In the following, the invention is explained in greater detail with reference to an exemplary embodiment schematically shown in the drawing.

In the drawing.

DETAILED DESCRIPTION OF THE PREFERRED EMBODIMENT

Figure 1:
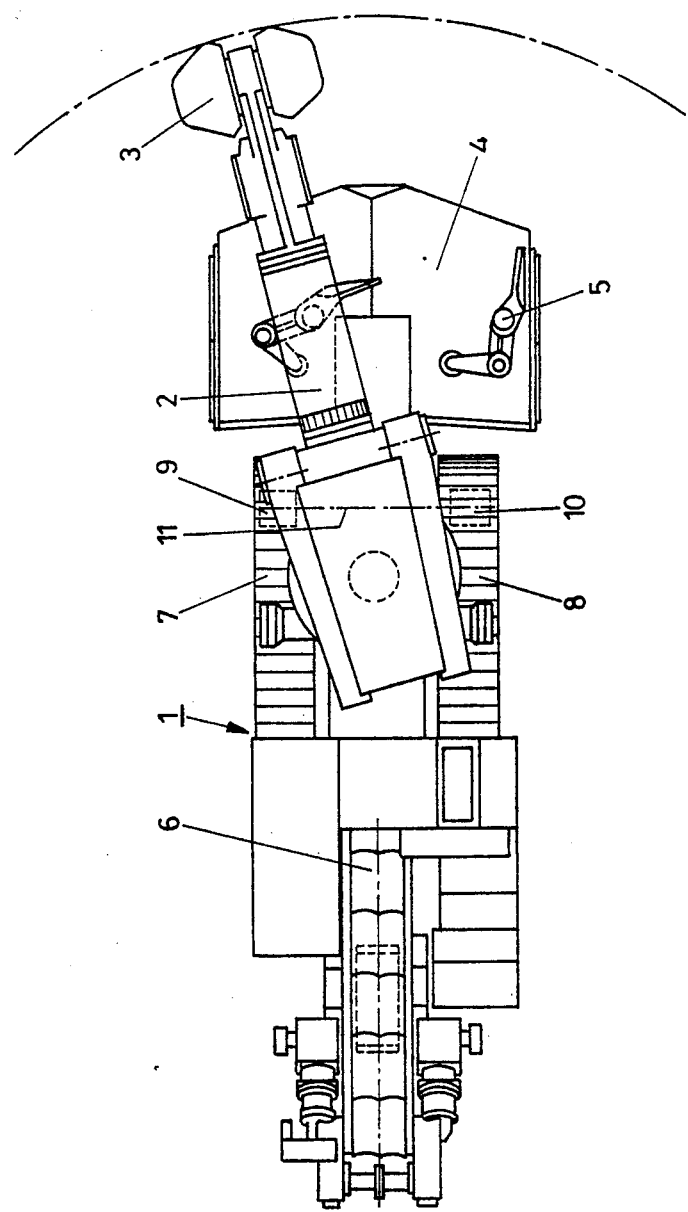
FIG. 1 shows a top plan view of a partial cut cutting machine comprising a chassis having respective treaded, longitudinally running, endless ground-engaging tracks supporting it along its laterally opposite sides.

FIG. 1 shows a cutting machine 1 having a universally swivellable cutting arm 2 comprising rotatably supported cutting heads 3. The shown cutting machine carries at its front end a loading equipment 4 having lobster claws 5 for removing the excavated material. This material is transported away by means of a continuous conveyor 6. The excavated material is discharged at the rear end of the machine onto subsequent conveyors.

The treaded, longitudinally running, endless ground-engaging tracks of the chassis of the cutting machine are designated by the reference numerals 7 and 8. A track-support caterpillar chassis of completely similar construction may be used also for other purposes than for a partial cut cutting machine. In place of a universally swivellable cutting arm 2, there can be supported on such a tracked chassis also a plurality of props for supporting the mine roof. Likewise, such tracked chassis may also have tracks 7 and 8 for vehicles of different type.

The tracks of the tracked chassis are driven by separate drive motors 9 and 10, the driving axes being schematically indicated by the reference numeral 11. In usual types of tracked-supported and track-propelled chassis, the drive motors 9 and 10 are designed as hydraulic motors which can be connected with separate supply units or hydraulic pumps.

Figure 2:
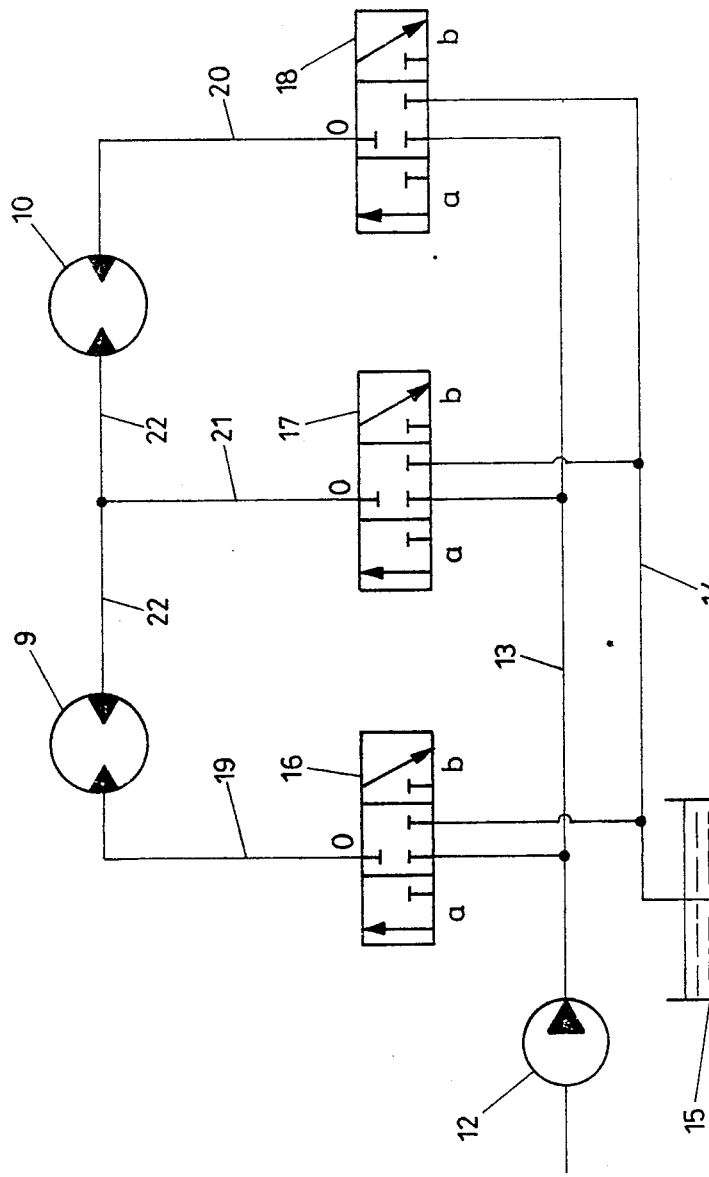
FIG. 2 schematically shows the valve arrangement for operating the drive motors of the track-supported chassis.

In the switching arrangement according to the invention and being shown in FIG. 2, supply of both drive motors 9 and 10 of the tracks 7 and 8 is effected by a common pump 12. Thus, only one supply unit or pump is required for supplying pressurized fluid into the supply conduit 13. In FIG. 2, the return conduit is designated by the reference numeral 14 and the tank, into which opens the return conduit 14, is designated by the reference numeral 15. Three multi-way valves 16, 17 and 18 are provided for controlling the drive motors 9 and 10. The multi-way valve 16 is connected with the drive motor 9 via the supply conduit 19 and the multi-way valve 18 is connected with the drive motor 10 via the supply conduit 20. The multi-way valve 17 is connected with the supply conduits 22 of both drive motors 9 and 10 via the conduit 21. Each of the valves 16, 17 and 18 has three switching positions, which are shown designated by a, O and b. By means of such a simple switching arrangement, there can now be made the following adjustments. If the multi-way valve 16 assumes the position a, the multi-way valve 17 assumes the position O and the multi-way valve 18 assumes the position b, both drive motors 9 and 10 are operated in a series arrangement which allows rapid forward travelling. Rapid backward travelling can be achieved by correspondingly transferring the multi-way valve 16 to the switching position b, the multi-way valve 17 to the switching position O and the multi-way valve 18 to the switching position a.

As an alternative to such a series arrangement, in which both drive motors 9 and 10 are subjected to only half of the acting pump pressure and thus may only develop half of the torque, there can be obtained a parallel arrangement of the drive motors 9 and 10 by switching over the multi-way valves 16, 17 and 18. For this purpose, the multi-way valve 16 can be transferred to the switching position a, the multi-way valve 17 can be transferred to the switching position b and the multi-way valve 18 can be transferred to the switching position a. In these switch positions, there results a mutually opposite driving effect on the tracks 7 and 8, because both drive motors 9 and 10 are now no longer connected in series, but are connected in parallel, and are thus subjected to pressurized fluid for mutually opposite movement. On account of the switching position b of the central multi-way valve 17, the pressurized fluid flowing out of the motor flows, via the common conduit 21, into the return conduit 14.

Reversal of the direction of rotation may be achieved by transferring the multi-way valve 16 to the switching position b, the multi-way valve 17 to the switching position a and the multi-way valve 18 to the switching position b.

In the series arrangement, the pressure of the pump is thus distributed to both motors 9 and 10, which results in half of the torque, but in a high speed. In the parallel arrangement required for turning around the vehicle in an extremely narrow space, the volumetric flow is distributed to both drive motors 9 and 10, which results in a high torque, but, in only half of the speed.

What is claimed is:

1. A track-laying vehicle, comprising:
    a chassis having a longitudinal axis and two laterally opposite sides;
    a pair of endless, ground-engaging tracks respectively arranged at said opposite sides of said chassis and operatively supporting said chassis;
    a first hydraulically operated motor means carried by said vehicle and operatively associated with one of said tracks, for selectively moving said track in a sense to tend to advance the respective side of said chassis in a forward direction, moving said one track in a sense to tend to advance the respective side of said chassis in a rearward direction, and not moving said one track;
    a second hydraulically operated motor means carried by said vehicle and operatively associated with the other of said tracks, for selectively moving said other track in a sense to tend to advance the respective side of said chassis in a forward direction, moving said other track in a sense to tend to advance the respective side of said chassis in a rearward direction, and not moving said other track;
    a hydraulic pump having an inlet side, a side connected to a supply of hydraulic fluid, and an outlet side;
    supply conduit means arranged for alternatively connecting said pump in series and in parallel with said outlet side of said hydraulic pump;
    a plurality of multi-way valve means incorporated in said conduit means;

return conduit means arranged connecting said multi-way valve means to a sump for spent hydraulic fluid;

said multi-way valve means being arranged to selectively interconnect said hydraulic pump, through said supply conduit means, with said first and second hydraulically operated motor means for selectively alternatively operating said motor means in each of the following modes:
- (a) both said motor means are connected in series with one another with said hydraulic pump and rotated in a sense to advance both tracks forward;
- (b) both said motor means are connected in series with one another with said hydraulic pump and rotated in a sense to advance both tracks rearward;
- (c) both said motor means are connected in parallel with one another with said hydraulic pump and rotated in a sense to advance said one track forward and said other track rearward; and
- (d) both said motor means are connected in parallel with one another with said hydraulic pump and rotated in a sense to advance said one track rearward and said other track forward;

said multi-way valve means being further arranged to selectively interconnect said hydraulic pump, through said supply conduit means, with said first and second hydraulically operating motor means such that, when both said motor means are connected in parallel with one another to said hydraulic pump, flow of hydraulic fluid to either of said motor means can be selectively cut-off for moving one but not the other, or the other but not the one track, forward or backward.

2. The track-laying vehicle of claim 1, wherein:

said multi-way valve means comprise a first, a second and a third three-way valves each having three ports;

a first port of each valve being arranged for connecting with said return conduit means;

a second port of each valve being arranged for connecting via said supply conduit means with said pump;

a third port of said first valve being arranged for connecting via said supply conduit means with said first motor means; a third port of said third valve being arranged for connecting via said supply conduit means with said second motor means; said supply conduit means including a segment interconnecting said first and second motor means; and a third port of said second valve being arranged for connecting via said supply conduit means with said branch, intermediate said first and second motor means.

3. The track-laying vehicle of claim 2, wherein:

said valves are slide valves.

* * * * *